(12) United States Patent  
Naim et al.

(10) Patent No.: US 9,198,105 B1
(45) Date of Patent: Nov. 24, 2015

(54) DETERMINING ACCESS NODE CAPACITY

(71) Applicant: Sprint Spectrum LP, Overland Park, KS (US)

(72) Inventors: Muhammad Naim, Sterling, VA (US); Shahzada Rasool, Vienna, VA (US); Daniel Vivanco, Sterling, VA (US); Yu Zhou, Herndon, VA (US)

(73) Assignee: Sprint Spectrum LP, Overland Park, KS (US)

( * ) Notice: Subject to any disclaimer, the term of this patent is extended or adjusted under 35 U.S.C. 154(b) by 210 days.

(21) Appl. No.: 13/931,388

(22) Filed: Jun. 28, 2013

(51) Int. Cl.
*H04W 4/00* (2009.01)
*H04B 1/38* (2015.01)
*H04W 36/22* (2009.01)

(52) U.S. Cl.
CPC ................................ *H04W 36/22* (2013.01)

(58) Field of Classification Search
None
See application file for complete search history.

(56) References Cited

U.S. PATENT DOCUMENTS

2009/0252113 A1   10/2009   Take
2010/0246507 A1*   9/2010   Dan .............................. 370/329

FOREIGN PATENT DOCUMENTS

WO   WO/2013/069708   *   5/2013

* cited by examiner

*Primary Examiner* — Kiet G Tang

(57) ABSTRACT

A throughput of information received from an access node at an application running on a wireless device is determined, and a modulation and coding scheme assigned to the wireless device to communicate with the access node is identified. Based on the throughput and the modulation and coding scheme, a number of free physical resource blocks per frame of the access node is estimated, to enable a determination of access node capacity.

16 Claims, 12 Drawing Sheets

DETERMINING ACCESS NODE CAPACITY

TECHNICAL BACKGROUND

The loading and capacity of an access node in a wireless communication system affects the provision of communication services to wireless devices in the access node coverage area. Information about access node capacity is used in decisions about wireless device admission, call control, and handover, among other things. The way in which access node capacity is determined can vary based on the specific implementation of the capacity determining mechanism, may be changed over time, and may also vary according to the vendor or other provider of the access node, so that loading and capacity information determined by one access node may be inconsistent with a determination at another access node. Further, an access node may not receive loading or capacity information from a neighboring access node. Where an access node is unable to determine the capacity of a neighboring access node, the access node may have to determine whether to perform a handover of a wireless device to the neighboring access node without information about the current loading or capacity of the neighbor.

OVERVIEW

In systems and methods of determining access node capacity, a throughput is determined of information received from an access node at an application running on a wireless device. In addition, a modulation and coding scheme assigned to the wireless device to communicate with the access node is identified. Based on the throughput and the modulation and coding scheme, a number of free physical resource blocks per frame of the access node is estimated, to enable a determination of access node capacity.

DETAILED DESCRIPTION

Figure 1:
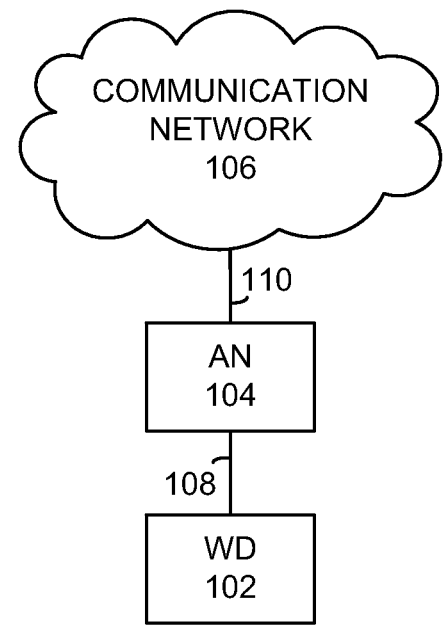
FIG. 1 illustrates an exemplary communication system to determine access node capacity.

FIG. 1 illustrates an exemplary communication system 100 to determine access node capacity comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise additional base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

The loading and capacity of access node 104 affects the provision of communication services to wireless device 102. Information about the capacity of access node 104 is typically used in decisions about, among other things, wireless device admission, call control, and handover. The determination of access node capacity can be implementation specific.

To determine access node capacity independently of a specific implementation at the access node, in operation, a throughput is determined of information received from access node 104 at an application running on wireless device 102. A modulation and coding scheme assigned to wireless device 102 to communicate with access node 104 is identified. Based on the throughput and the modulation and coding scheme, a number of free physical resource blocks per frame of access node 104 is estimated.

Figure 2:
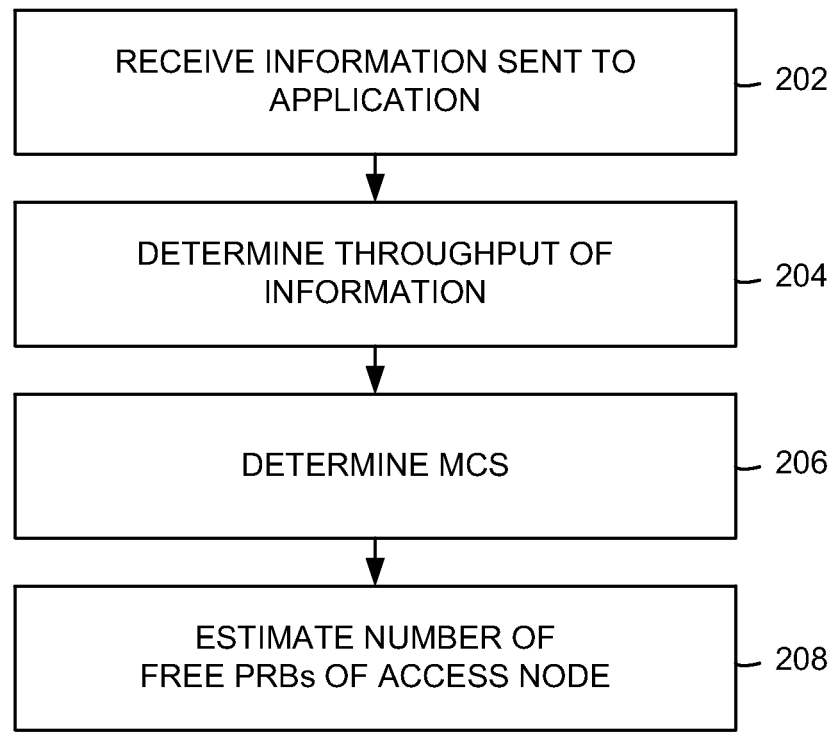
FIG. 2 illustrates an exemplary method of determining access node capacity device.

FIG. 2 illustrates an exemplary method of determining access node capacity. Information is sent to an application running on a wireless device in communication with an access node (operation 202), and a throughput is determined of the information received at application running on the wireless device (operation 204). For example, information can be sent to wireless device 102 from access node 104, and the information can be received at an application running on wireless device 102 over communication link 108. Wireless device 102 can launch the application and request that the access node send the information to the application. Alternatively, access node 104 (or another network element of communication system 100) can instruct wireless device 102 to launch the application, and access node 104 can send the information to wireless device 102.

Figure 3A:
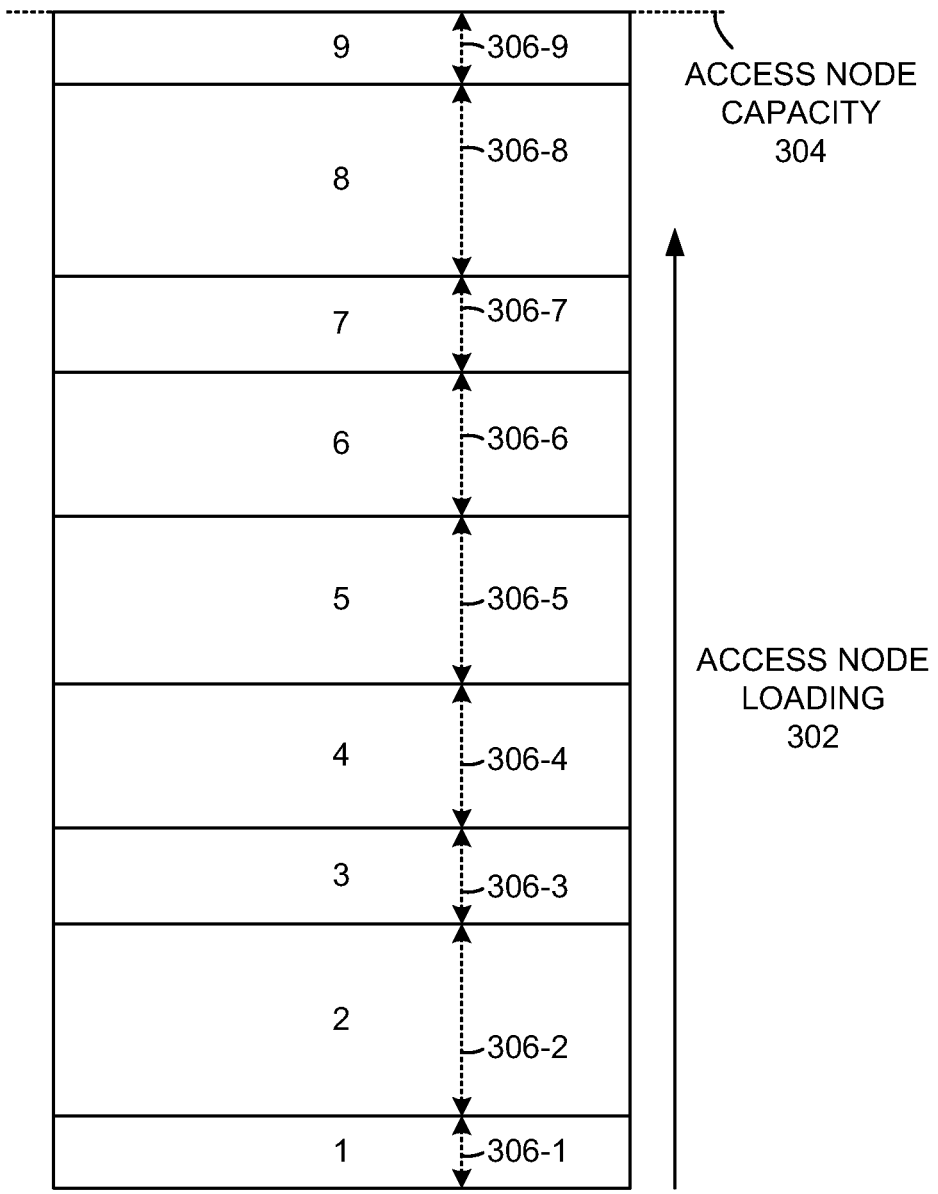
FIGS. 3A, 3B and 3C provide exemplary illustrations of access node capacity and traffic loading according to traffic class indicators.

The information sent by access node 104 can be associated with a particular traffic class indicator. FIG. 3A illustrates a capacity of access node 104 (access node capacity 304) comprised of data traffic associated with a traffic class indicator. The traffic class indicator can indicate minimum characteristics, such as data priority, maximum permitted data delay, etc., required by an application or a data service. Traffic class indicators can specify packet forwarding treatment (e.g. scheduling, queue management, wireless communication link configuration, and the like) at access node 104. FIG. 3A provides an exemplary illustration a loading of an access node comprising data traffic associated with one of nine traffic class indicators, from highest priority (1) to lowest priority (9). (It will be understood that the number of traffic class indicators illustrated, their specific labeling with Arabic numerals, and the particular order of the traffic class indicators illustrated in FIG. 3 is not limiting.) Access node loading 302 comprises an amount of data traffic 306-1 associated with traffic class indicator 1, an amount of data traffic 306-2 associated with traffic class indicator 2, and so forth, through an amount of data traffic 306-9 associated with traffic class indicator 9.

Figure 3B:
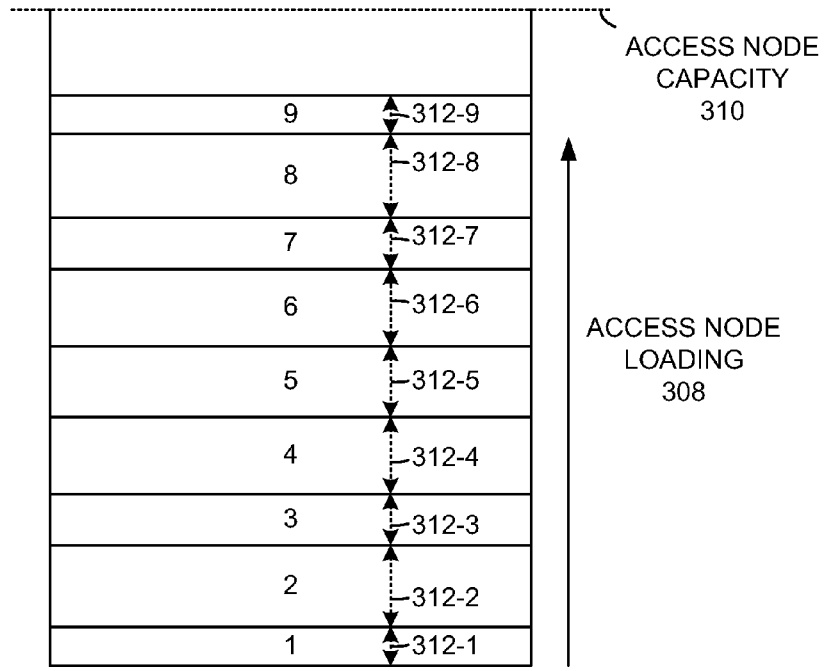
Figure 3C:
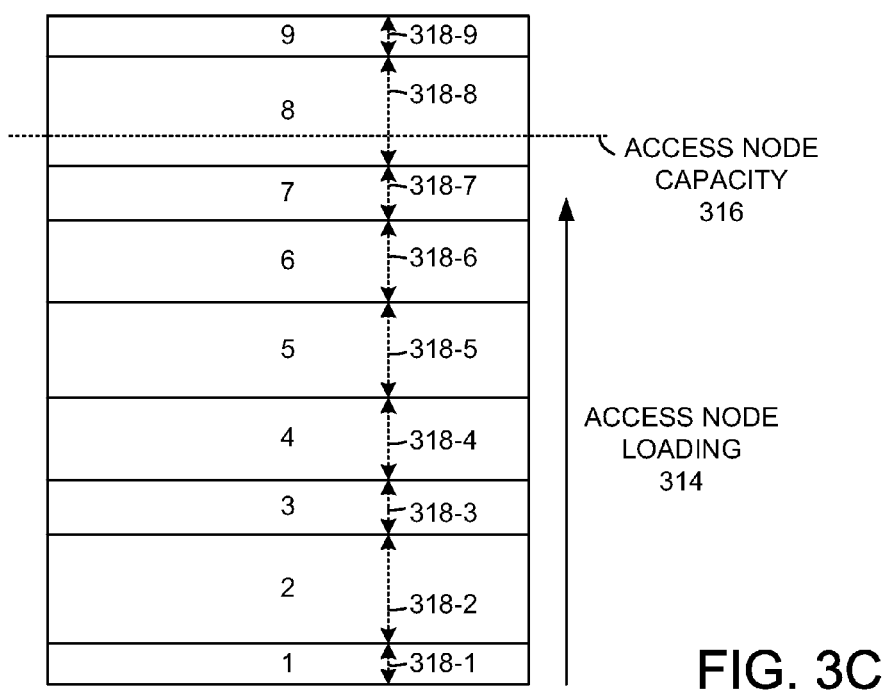

Access node 104 can allocate wireless communication link resources based on the traffic class indicator. Typically, communication link resources, such as resource blocks, are first allocated to data traffic of the highest priority traffic class indicator (here, class 1), then to the next highest priority traffic class indicator, (e.g., 2), and so forth. As illustrated in FIG. 3A, nine amounts of data traffic 306-1 through 306-9, meet an access node capacity 304. However, access node loading 302 may not meet access node capacity 304. For example, as illustrated in FIG. 3B, the amounts of data traffic 312-1 through 312-9 may be less than access node capacity 310. Where access node loading 302 exceeds the access node capacity, such as access node capacity 316 illustrated in FIG. 3C, because larger amounts of traffic are present, access node 104 may not have capacity available to provide to traffic of traffic class indicator 9 (318-9), or to all traffic of traffic class indicator 8 (318-8), and the like. Thus, the lowest priority traffic class can suffer resource starvation, and the apparent throughput of data traffic in these traffic classes will be relatively low. In other words, wireless communication link resources are typically assigned to traffic of a lowest traffic class indicator when they are available (i.e., not allocated to any other traffic class). A resource block typically refers to a unit of wireless communication link resources which can be allocated to data traffic, for example, a specific number of subcarriers (or a specific bandwidth of a frequency band) for a predetermined amount of time.

In an embodiment, the information sent to the application running on wireless device can be associated with the lowest traffic class indicator from among a plurality of traffic class indicators. For example, information sent to wireless device 102 from access node 104 can be associated with traffic class indicator 9. A throughput is determined of the information received at application running on the wireless device.

In operation 206, a modulation and coding scheme which is assigned to the wireless device to communicate with the access node is determined. For example, wireless device 102 can be instructed to use a particular modulation and coding scheme to communicate with access node 104. The assigned modulation and coding scheme affects the bit rate and robustness of data transmission between wireless device 102 and access node 104. Examples of a modulation and coding scheme include quadrature phase shift keying (QPSK), 16 quadrature amplitude modulation (16QAM), 64 quadrature amplitude modulation (64QAM), and the like. The modulation and coding scheme can also include an amount of data repetition to provide for forward error correction of the transmitted data.

Based on the throughput and the modulation and coding scheme, a number of free physical resource blocks per frame of the access node is estimated (operation 208). When the information sent to the application running on the wireless device is associated with the lowest traffic class indicator, resource blocks are typically only allocated to the lowest traffic class indicator when they are not used for any higher priority traffic class. Accordingly, a number of wireless resources, such as resource blocks or other similar wireless communication link resources, allocated to carry information associated with the lowest traffic class indicator can provide an indication of the unutilized or free resources available at the access node.

Figure 4:
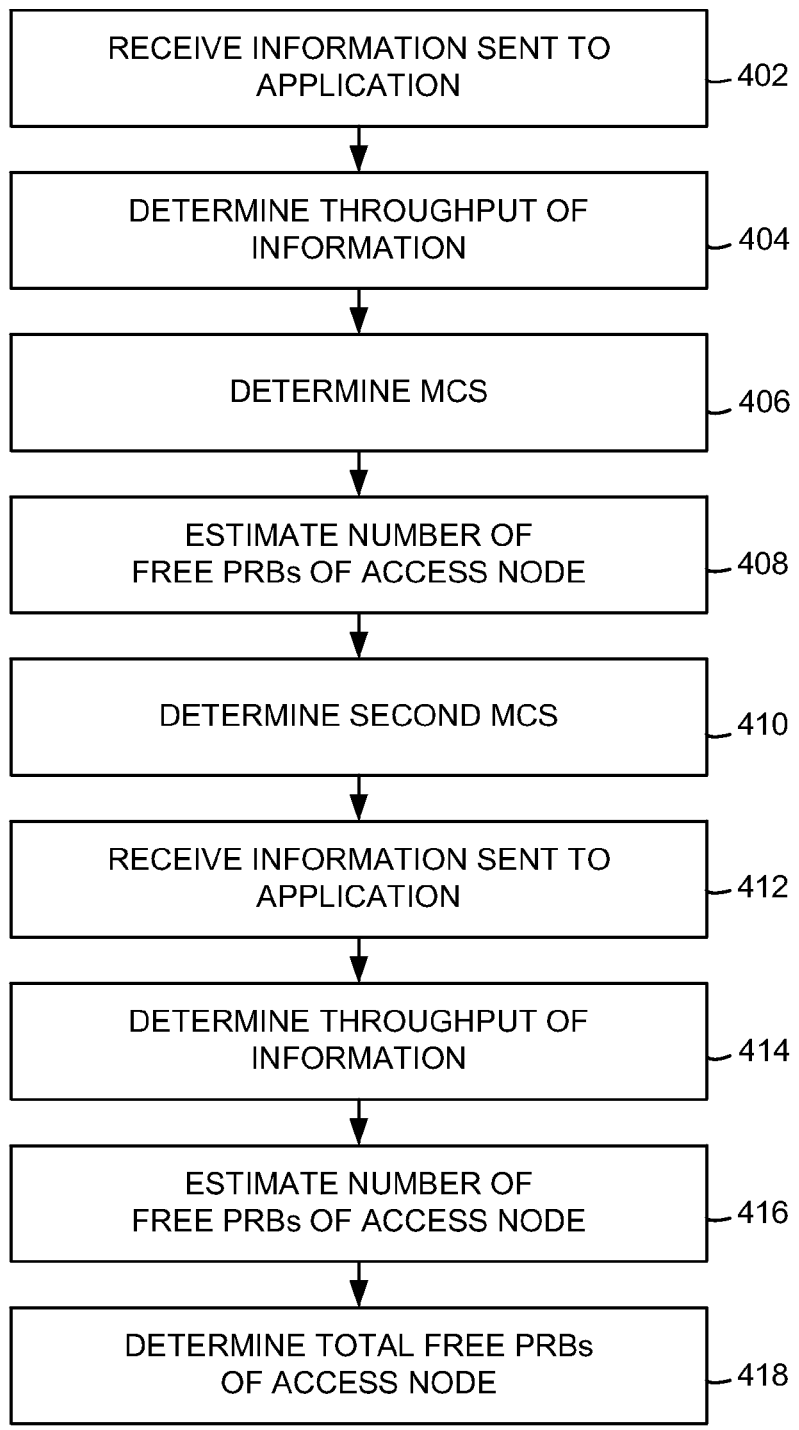
FIG. 4 illustrates another exemplary method of determining access node capacity device.

FIG. 4 illustrates another exemplary method of determining access node capacity device. Information is sent to an application running on a wireless device in communication with an access node (operation 402), and a throughput is determined of the information received at application running on the wireless device (operation 404). For example, information can be sent to wireless device 102 from access node 104, and the information can be received at an application running on wireless device 102 over communication link 108. Wireless device 102 can launch the application and request that the access node send the information to the application. Alternatively, access node 104 (or another network element of communication system 100) can instruct wireless device 102 to launch the application, and access node 104 can send the information to wireless device 102.

The information sent by access node 104 can be associated with a particular traffic class indicator, and access node 104 can allocate wireless communication link resources based on the traffic class indicator. In an embodiment, the information sent to the application running on wireless device can be associated with the lowest traffic class indicator from among a plurality of traffic class indicators. For example, information sent to wireless device 102 from access node 104 can be associated with a lowest traffic class indicator from among a plurality of traffic class indicators. A throughput is determined of the information received at application running on the wireless device.

In operation 406, a modulation and coding scheme which is assigned to the wireless device to communicate with the access node is determined. For example, wireless device 102 can be instructed to use a particular modulation and coding scheme to communicate with access node 104. The assigned modulation and coding scheme affects the bit rate and robustness of data transmission between wireless device 102 and access node 104. Examples of a modulation and coding scheme include quadrature phase shift keying (QPSK), 16 quadrature amplitude modulation (16QAM), 64 quadrature amplitude modulation (64QAM), and the like. The modulation and coding scheme can also include an amount of data repetition to provide for forward error correction of the transmitted data.

Based on the throughput and the modulation and coding scheme, a first number of free physical resource blocks per frame of the access node is estimated (operation 408). When the information sent to the application running on the wireless device is associated with the lowest traffic class indicator, resource blocks are typically only allocated to the lowest traffic class indicator when they are not used for any higher priority traffic class. Accordingly, a number of wireless resources, such as resource blocks or other similar wireless communication link resources, allocated to carry information associated with the lowest traffic class indicator can provide an indication of the unutilized or free resources available at the access node.

When the first number of free physical resource blocks per frame of the access node is estimated, a second modulation and coding scheme is determined (operation 410), the assigned modulation and coding scheme is changed to the second modulation and coding scheme, and information is sent to the application running on the wireless device (operation 412). When the information is received using the second modulation and coding scheme, a throughput is determined of the information received at application running on the wireless device (operation 414). The information can be sent to wireless device 102 from access node 104 over communication link 108 using the second modulation and coding scheme. Because the assigned modulation and coding scheme affects the bit rate and robustness of data transmission between wireless device 102 and access node 104, determining a throughput of the information sent using more than one modulation and coding scheme can provide a more accurate assessment of the achievable throughput over wireless communication link 108.

Based on the second modulation and coding scheme and the second throughput, a second number of free physical resource blocks per frame of the access node can be determined (operation 416). Using the first number of free physical resource blocks per frame of the access node and the second number of free physical resource blocks per frame of the access node, a total of free wireless communication link resources (such as physical resource blocks or another similar wireless link resource) can be determined. In an embodiment, the first and second numbers of physical resource blocks can be determined on a per-frame basis. Accordingly, a total number of free physical resource blocks per frame of the access node can be determined based on the estimated number of free physical resource blocks per frame and the second number of free physical resource blocks per frame. A frame can comprise a known number of physical resource blocks, and a determination of the number of free physical resource blocks per frame can provide an indication of available capacity of the access node.

Figure 5:
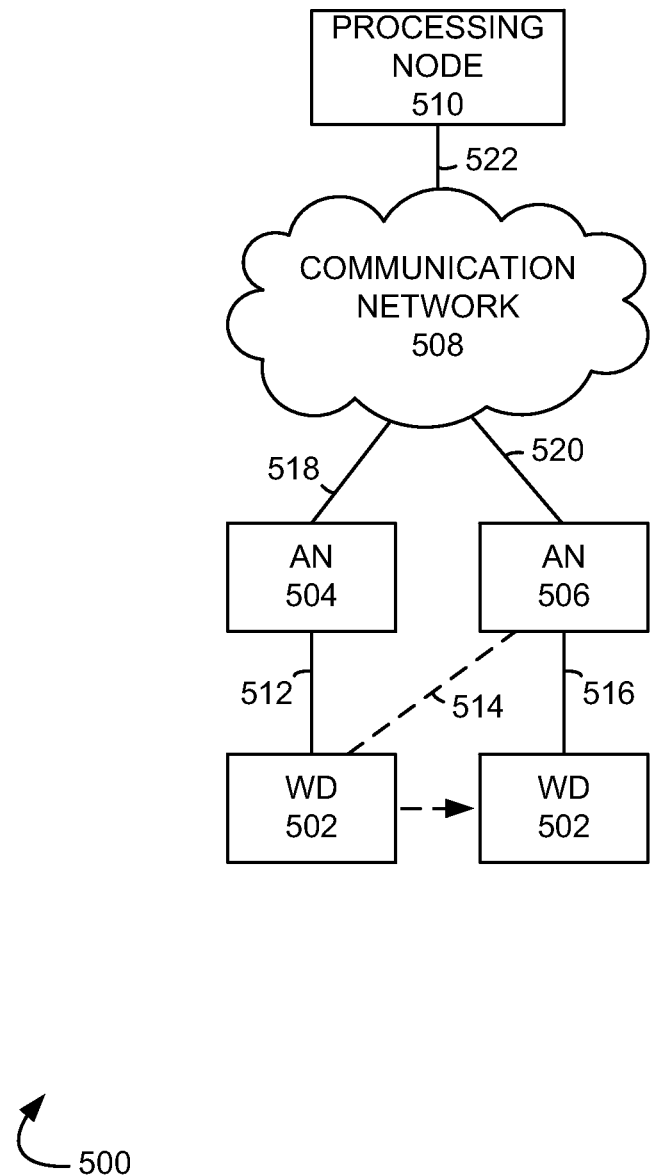
FIG. 5 illustrates another exemplary system to determine access node capacity.

FIG. 5 illustrates another exemplary system 500 to determine access node capacity comprising wireless device 502, access nodes 504 and 506, communication network 508, and processing node 510. Examples of wireless device 502 can comprise a cell phone, a smart phone, a computing platform such as a laptop, palmtop, or tablet, a personal digital assistant, or an internet access device, including combinations thereof. Wireless device 502 can communicate with access node 504 over communication link 512, and with access node 506 over communication link 516. Wireless device 502 can also receive information from access node 506 over communication link 514.

Access nodes 504 and 506 are each a network node capable of providing wireless communications to wireless device 502, and can be, for example, a base transceiver station, a radio base station, an eNodeB device, or an enhanced eNodeB device. Access node 504 is in communication with communication network 508 over communication link 518, and access node 506 is in communication with communication network 508 over communication link 520.

Communication network 508 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 508 can be capable of carrying voice information and other data, for example, to support communications by a wireless device such as wireless device 502. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 508 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 508 may also comprise a wireless network, including base stations, wireless communication nodes, telephony switches, internet routers, network gateways, computer systems, communication links, or some other type of communication equipment, and combinations thereof.

Processing node 510 is in communication with communication network 508 over communication link 512, and can comprise a processor and associated circuitry to execute or direct the execution of computer-readable instructions. Processing node 510 can be configured to maintain determine the capacity of an access node such as access node 504 or access node 506. Processing node 510 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 510 can receive instructions and other input at a user interface. Examples of processing node 510 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and network gateways, including combinations thereof.

Communication links 512, 514, 516, 518, 520 and 522 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 504, access node 506, communication network 508 and processing node 510 which are omitted for clarity, including additional processing nodes, routers, gateways, and physical and/or wireless data links for carrying data among the various network elements.

Figure 6:
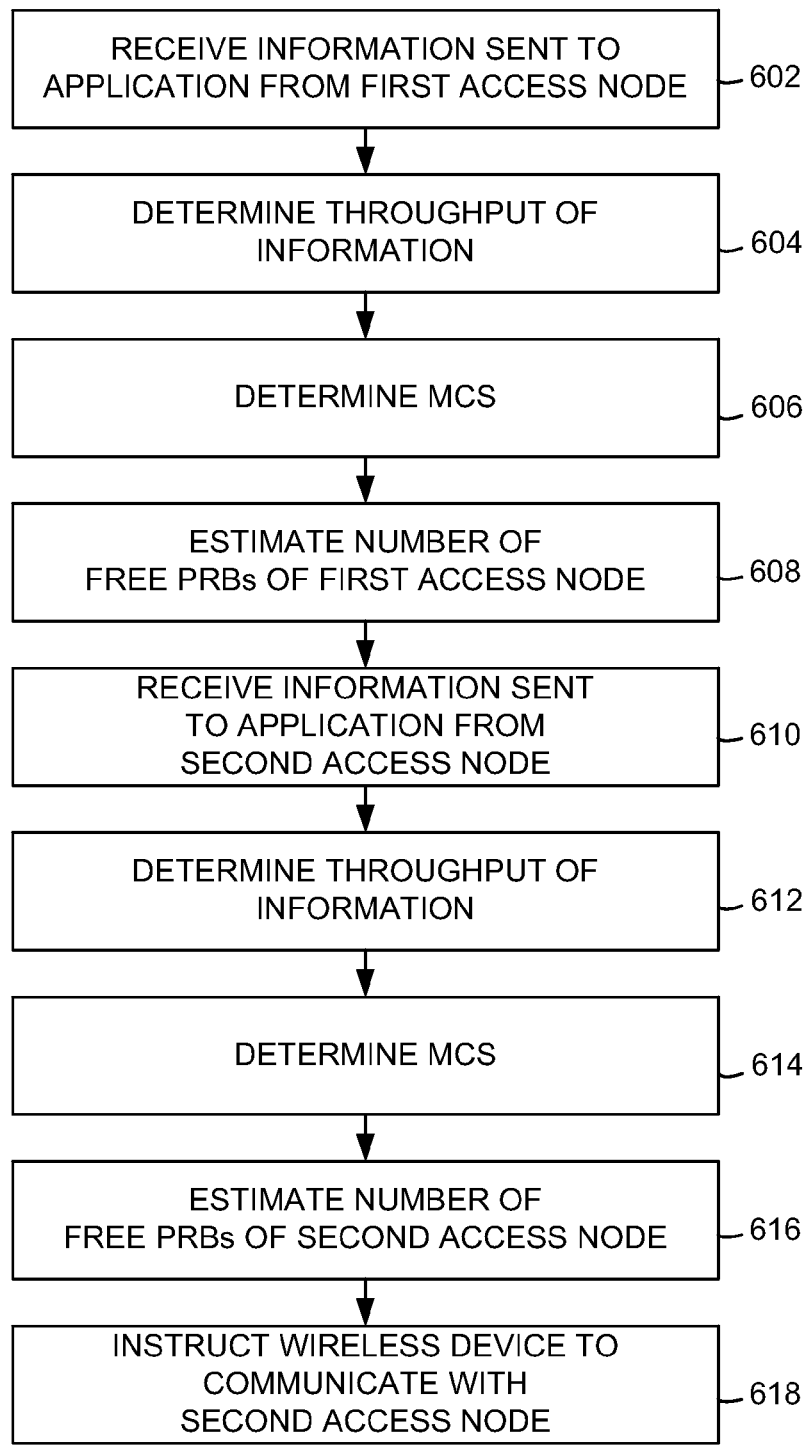
FIG. 6 illustrates another exemplary method of determining access node capacity device.

FIG. 6 illustrates another exemplary method of determining access node capacity device. Information is sent to an application running on a wireless device in communication with an access node (operation 602), and a throughput is determined of the information received at application running on the wireless device (operation 604). For example, information can be sent to wireless device 502 from access node 504, and the information can be received at an application running on wireless device 502 over communication link 512. Wireless device 502 can launch the application and request that the access node send the information to the application. Alternatively, processing node 510, access node 504, or another network element of communication system 500 can instruct wireless device 502 to launch the application, and access node 504 can send the information to wireless device 502. In an embodiment, the information sent to wireless device 502 can be test data.

The information sent by access node 504 can be associated with a particular traffic class indicator, and access node 504 can allocate wireless communication link resources based on the traffic class indicator. In an embodiment, the information sent to the application running on wireless device can be associated with the lowest traffic class indicator from among a plurality of traffic class indicators. For example, information sent to wireless device 502 from access node 504 can be associated with a lowest traffic class indicator from among a plurality of traffic class indicators. A throughput is determined of the information received at application running on the wireless device.

In operation 606, a modulation and coding scheme which is assigned to the wireless device to communicate with the access node is determined. For example, wireless device 502 can be instructed to use a particular modulation and coding scheme to communicate with access node 504. The assigned modulation and coding scheme affects the bit rate and robustness of data transmission between wireless device 502 and access node 504. Examples of a modulation and coding scheme include quadrature phase shift keying (QPSK), 16 quadrature amplitude modulation (16QAM), 64 quadrature amplitude modulation (64QAM), and the like. The modulation and coding scheme can also include an amount of data repetition to provide for forward error correction of the transmitted data.

Based on the throughput and the modulation and coding scheme, a first number of free physical resource blocks per frame of the access node is estimated (operation 608). When the information sent to the application running on the wireless device is associated with the lowest traffic class indicator, resource blocks are typically only allocated to the lowest traffic class indicator when they are not used for any higher priority traffic class. Accordingly, a number of wireless resources, such as resource blocks or other similar wireless communication link resources, allocated to carry information associated with the lowest traffic class indicator can provide an indication of the unutilized or free resources available at the access node.

In operation 610, second information is sent to the application running on the wireless device from a second access node, and a throughput is determined of the second information received at application running on the wireless device (operation 612). For example, information can be sent to wireless device 502 from access node 506, and the information can be received at an application running on wireless device 502 over communication link 514. For example, wireless device can be located in a geographic area in which it can receive information from both access node 504 and access node 506.

In an embodiment, the first access node does not receive capacity information from the second access node. For example, access node 504 may not receive any capacity information from access node 506. Access node 506 may not provide capacity (or loading) information to access node 504 because a communication link between access nodes 504 and 506 has failed or does not exist, or because access node 506 is associated with a different provider network which does not share capacity/loading information, or because access node 506 is not properly configured to share loading or capacity information with access node 504, or for some other reason. In any event, access node 504 does not receive capacity or loading information from access node 506.

Similar to the information sent from access node 506, the second information sent by access node 506 can be associated with a particular traffic class indicator, such as the lowest traffic class indicator from among a plurality of traffic class indicators. For example, information sent to wireless device 502 from access node 506 can also be associated with traffic class indicator 9. A second throughput can be determined of the second information received at the application running on the wireless device.

In operation 614, a modulation and coding scheme which is assigned to the communication of the second information to the wireless device is determined. For example, the second information can be sent to wireless device 502 using a particular modulation and coding scheme. The assigned modulation and coding scheme affects the bit rate and robustness of data transmission between wireless device 502 and access node 506. Examples of a modulation and coding scheme include quadrature phase shift keying (QPSK), 16 quadrature amplitude modulation (16QAM), 64 quadrature amplitude modulation (64QAM), and the like. The modulation and coding scheme can also include an amount of data repetition to provide for forward error correction of the transmitted data.

Based on the second throughput and the second modulation and coding scheme, a second number of free physical resource blocks per frame of second access node is estimated (operation 616). When the information sent to the application running on the wireless device is associated with the lowest traffic class indicator, resource blocks are typically only allocated to the lowest traffic class indicator when they are not used for any higher priority traffic class. Accordingly, a number of wireless resources, such as resource blocks or other similar wireless communication link resources, allocated to carry information associated with the lowest traffic class indicator can provide an indication of the unutilized or free resources available at the access node.

In operation 618, the wireless device is instructed to change from communicating with the access node to communicating with the second access node based on the estimated number of free physical resource blocks per frame of the access node and of the second access node. For example, based on the determined first number of free physical resource blocks and second number of physical resource blocks, it can be determined that access node 506 has a greater number of unutilized physical resource blocks—in other words, that access node has greater capacity than access node 504—and wireless device 502 can be instructed to change to communicating with access node 506 over communication link 516. For example, based on the first number of free physical resource blocks and second number of physical resource blocks, a handover can be performed to hand wireless device 502 over to access node 506. Thus, communication system 500 can determine access node capacity independent of any mechanism or particular implementation of a capacity determining mechanism at one of access node 504 or access node 506.

Figure 7:
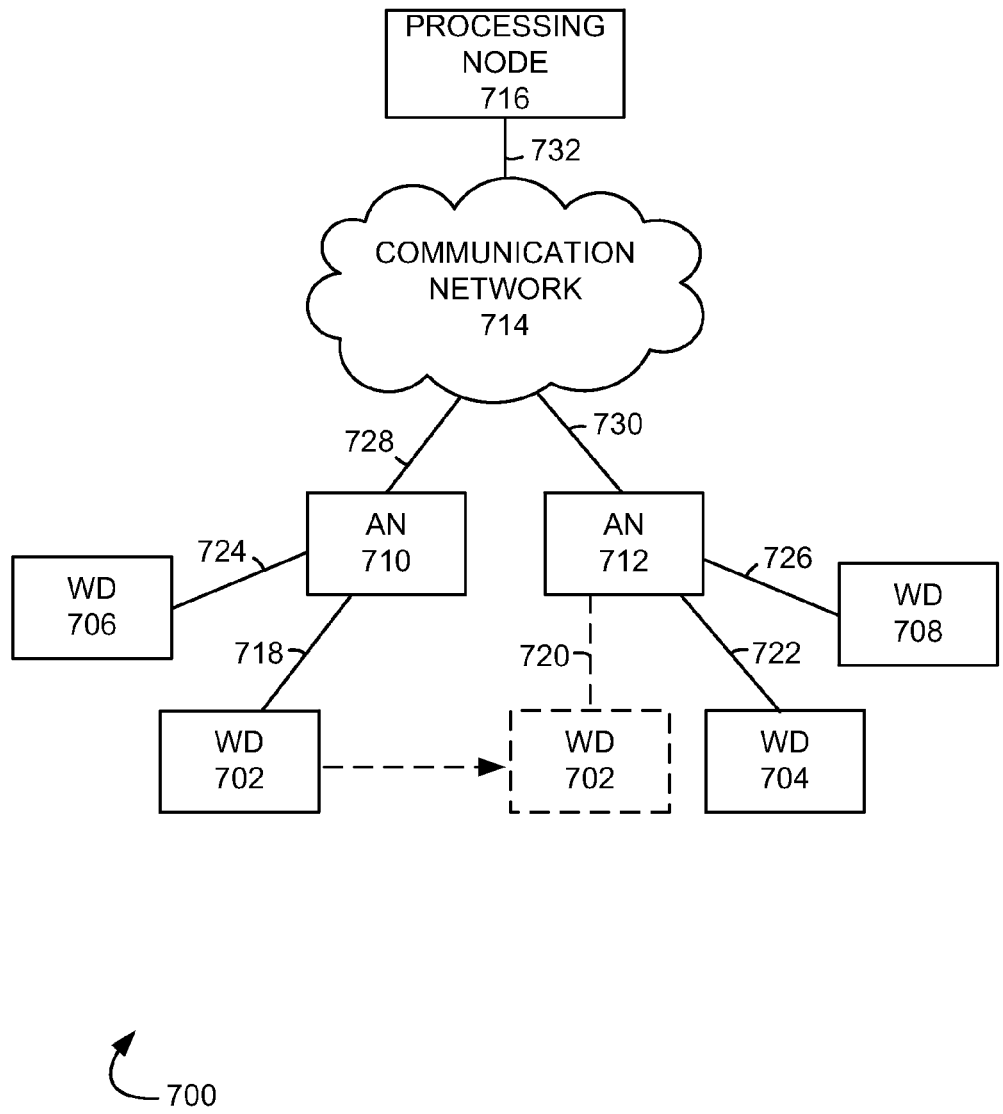
FIG. 7 illustrates another exemplary system to determine access node capacity.

FIG. 7 illustrates another exemplary system 700 to determine access node capacity comprising wireless devices 702, 704, 706 and 708, access nodes 710 and 712, communication network 714, and processing node 716. Examples of wireless devices 702, 704, 706 and 708 can comprise a cell phone, a smart phone, a computing platform such as a laptop, palmtop, or tablet, a personal digital assistant, or an internet access device, including combinations thereof. Wireless device 702 can communicate with access node 710 over communication link 718, and with access node 712 over communication link 720. Wireless device 704 can communicate with access node 712 over communication link 722. Wireless device 706 can communicate with access node 710 over communication link 724. Wireless device 708 can communicate with access node 712 over communication link 726.

Access nodes 710 and 712 are each a network node capable of providing wireless communications to wireless devices 702, 704, 706 and 708, and can be, for example, a base transceiver station, a radio base station, an eNodeB device, or an enhanced eNodeB device. Access node 710 is in communication with communication network 714 over communication link 728, and access node 712 is in communication with communication network 714 over communication link 730.

Communication network 714 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 714 can be capable of carrying voice information and other data, for example, to support communications by a wireless device such as wireless devices 702, 704, 706 and 708. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 714 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 714 may also comprise a wireless network, including base stations, wireless communication nodes, telephony switches, internet routers, network gateways, computer systems, communication links, or some other type of communication equipment, and combinations thereof.

Processing node 716 is in communication with communication network 714 over communication link 732, and can comprise a processor and associated circuitry to execute or direct the execution of computer-readable instructions. Processing node 716 can be configured to determine the capacity of an access node such as access node 710 or access node 712. Processing node 716 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 716 can receive instructions and other input at a user interface. Examples of processing node 716 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and network gateways, including combinations thereof.

Communication links 718, 720, 722, 724, 726, 728, 730 and 732 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 700 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 710, access node 712, communication network 714 and processing node 716 which are omitted for clarity, including additional processing nodes, routers, gateways, and physical and/or wireless data links for carrying data among the various network elements.

Figure 8:
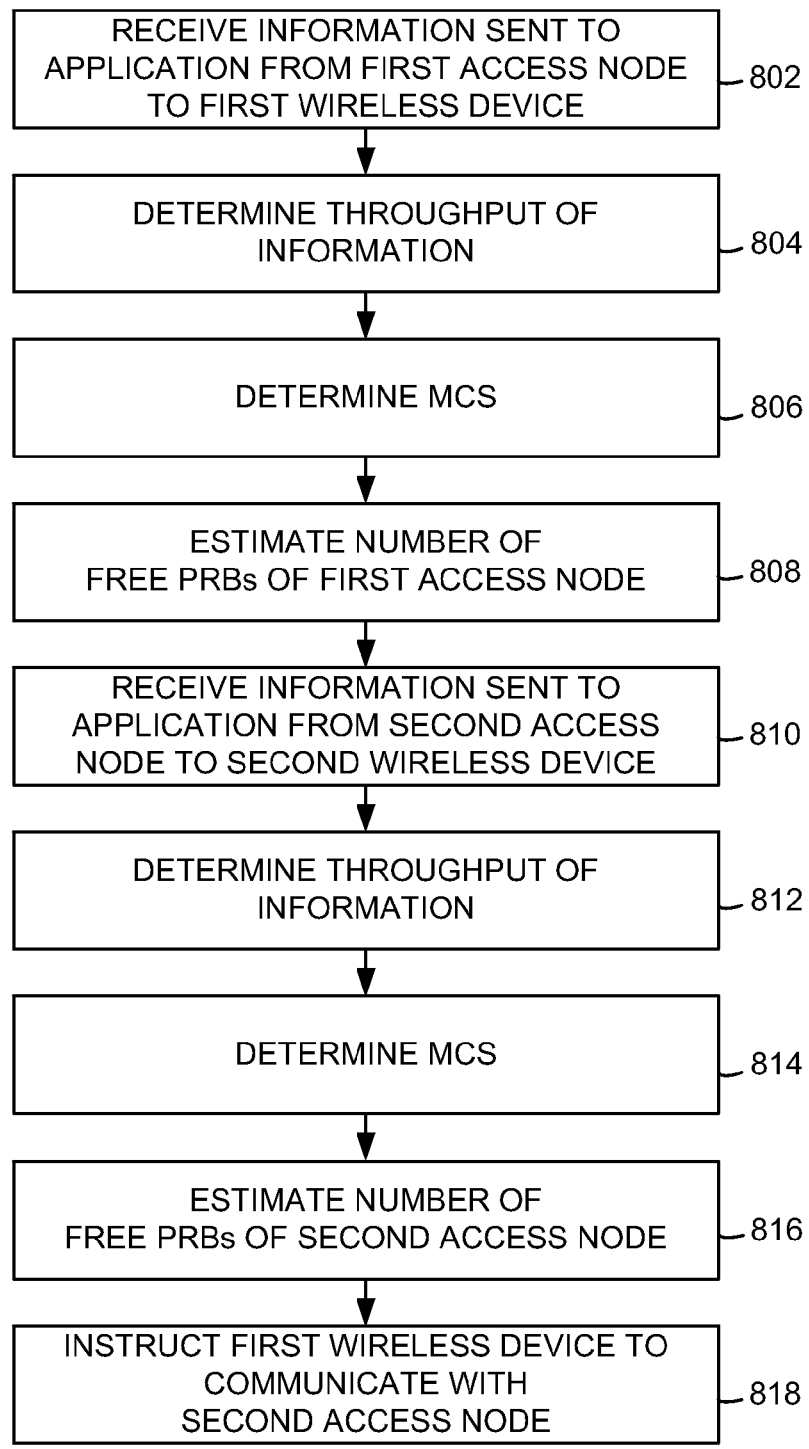
FIG. 8 illustrates another exemplary method of determining access node capacity device.

FIG. 8 illustrates another exemplary method of determining access node capacity device. Information is sent to an application running on a first wireless device in communication with a first access node (operation 802), and a throughput is determined of the information received at application running on the first wireless device (operation 804). For example, information can be sent to first wireless device 702 from first access node 710, and the information can be received at an application running on first wireless device 702 over communication link 718. Wireless device 702 can launch the application and request that access node 710 send the information to the application. Alternatively, processing node 716, access node 710, or another network element of communication system 700 can instruct wireless device 702 to launch the application, and access node 710 can send the information to wireless device 702. In an embodiment, the information sent to wireless device 702 can be test data.

The information sent by access node 710 can be associated with a particular traffic class indicator, and access node 710 can allocate wireless communication link resources based on the traffic class indicator. In an embodiment, the information sent to the application running on wireless device can be associated with the lowest traffic class indicator from among a plurality of traffic class indicators. For example, information sent to wireless device 702 from access node 710 can be associated with a lowest traffic class indicator from among a plurality of traffic class indicators. A throughput is determined of the information received at application running on the wireless device.

In operation 806, a modulation and coding scheme which is assigned to the wireless device to communicate with the access node is determined. For example, wireless device 702 can be instructed to use a particular modulation and coding scheme to communicate with access node 710. The assigned modulation and coding scheme affects the bit rate and robustness of data transmission between wireless device 702 and access node 710. Examples of a modulation and coding scheme include quadrature phase shift keying (QPSK), 16 quadrature amplitude modulation (16QAM), 64 quadrature amplitude modulation (64QAM), and the like. The modulation and coding scheme can also include an amount of data repetition to provide for forward error correction of the transmitted data.

Based on the throughput and the modulation and coding scheme, a number of free physical resource blocks per frame of the first access node is estimated (operation 808). When the information sent to the application running on first wireless device 702 is associated with the lowest traffic class indicator, resource blocks are typically only allocated to the lowest traffic class indicator when they are not used for any higher priority traffic class. Accordingly, a number of wireless resources, such as resource blocks or other similar wireless communication link resources, allocated to carry information associated with the lowest traffic class indicator can provide an indication of the unutilized or free resources available at the access node.

In operation 810, second information is sent to an application running on a second wireless device from a second access node, and a second throughput is determined of the second information received at the application running on the second wireless device (operation 812). For example, information can be sent to wireless device 704 from access node 712, and the information can be received at an application running on wireless device 704 over communication link 722.

In an embodiment, the first access node does not receive capacity information from the second access node. For example, access node 710 may not receive capacity or loading information from access node 712. Access node 712 may not provide capacity (or loading) information to access node 710 because a communication link between access nodes 710 and 712 has failed or does not exist, or because access node 712 is associated with a different provider network than access node 710 which does not share capacity/loading information, or because access node 712 is not properly configured to share loading or capacity information with access node 710, or for some other reason. In any event, access node 710 does not receive capacity or loading information from access node 712.

Similar to the information sent from access node 710, the second information sent by access node 712 can be associated with a particular traffic class indicator, such as the lowest traffic class indicator from among a plurality of traffic class indicators. A second throughput can be determined of the second information received at the application running on the second wireless device.

In operation 814, a modulation and coding scheme which is assigned to the communication of the second information to the wireless device is determined. For example, the second information can be sent to wireless device 704 using a particular modulation and coding scheme. The assigned modulation and coding scheme affects the bit rate and robustness of data transmission between wireless device 704 and access node 712. Examples of a modulation and coding scheme include quadrature phase shift keying (QPSK), 16 quadrature amplitude modulation (16QAM), 64 quadrature amplitude modulation (64QAM), and the like. The modulation and coding scheme can also include an amount of data repetition to provide for forward error correction of the transmitted data.

Based on the second throughput and the second modulation and coding scheme, a second number of free physical resource blocks per frame of the second access node is estimated (operation 816). When the information sent to the application running on second wireless device 704 is associated with the lowest traffic class indicator, resource blocks are typically only allocated to the lowest traffic class indicator when they are not used for any higher priority traffic class. Accordingly, a number of wireless resources, such as resource blocks or other similar wireless communication link resources, allocated to carry information associated with the lowest traffic class indicator can provide an indication of the unutilized or free resources available at the access node.

Additional wireless devices can receive information from access nodes to improve the accuracy of determinations of access node capacity. In an embodiment, a third throughput of information received from the first access node at an application running on a third wireless device can be determined. For example, a third wireless device 706 can be in communication with access node 710, and can be sent information from access node 710. The information can be sent to an application running on wireless device 706 which can be analogous to the application running on wireless device 702. The information can also be associated with a traffic class identifier, which can be a lowest traffic class identifier from among a plurality of traffic class identifiers. Further, a modulation and coding scheme assigned to third wireless device 706 to communicate with first access node 710 can be identified, wherein the modulation and coding scheme assigned to third wireless device 706 is different than the modulation and coding scheme assigned to first wireless device 702.

Additionally, a fourth throughput of information received from the second access node at an application running on a fourth wireless device can be determined, and a modulation and coding scheme assigned to the fourth wireless device to communicate with the second access node can be identified, wherein the modulation and coding scheme assigned to the fourth wireless device is different than the modulation and coding scheme assigned to the second wireless device. For example, access node 712 can send information to wireless device 708 over communication link 726, and the throughput of the information as well as the assigned modulation and coding scheme can be determined.

The determined throughputs and modulation and coding schemes can be used to more accurately estimate the number of free physical resource blocks per frame at access nodes 710 and 712. For example, based on the first throughput, the modulation and coding scheme assigned to the first wireless device, the third throughput, and the modulation and coding scheme assigned to the third wireless device the number of free physical resource blocks per frame can be estimated for the first access node Also, based on the second throughput, the modulation and coding scheme assigned to the second wireless device, the fourth throughput, and the modulation and coding scheme assigned to the fourth wireless device, the number of free physical resource blocks per frame of the second access node can be estimated.

In operation 818, the first wireless device is instructed to change from communicating with the first access node to communicating with the second access node based on the estimated number of free physical resource blocks per frame of the access node and of the second access node. For example, based on the determined first number of free physical resource blocks and second number of physical resource blocks, it can be determined that access node 712 has a greater number of unutilized physical resource blocks—in other words, that access node has greater capacity than access node 710—and wireless device 702 can be instructed to change to communicating with access node 712 over communication link 720. In an embodiment, based on the first number of free physical resource blocks and second number of physical resource blocks, a handover can be performed to hand wireless device 702 over to access node 712. Thus, communication system 700 can determine access node capacity independent of any mechanism or particular implementation of a capacity determining mechanism at one of access node 710 or access node 712. The first wireless device can be instructed to change from communicating with the first access node to communicating with the second access node by processing node 716. Additionally, or alternatively, processing node 716 can provide the determination of access node capacity to access node 710, and access node 710 can instruct the first wireless device to change from communicating with first access node 710 to communicating with second access node 712. Further, processing node 716 can provide the determination of access node capacity to wireless device 702, and wireless device 702 can request to be instructed to change from communicating with first access node 710 to communicating with second access node 712.

Figure 9:
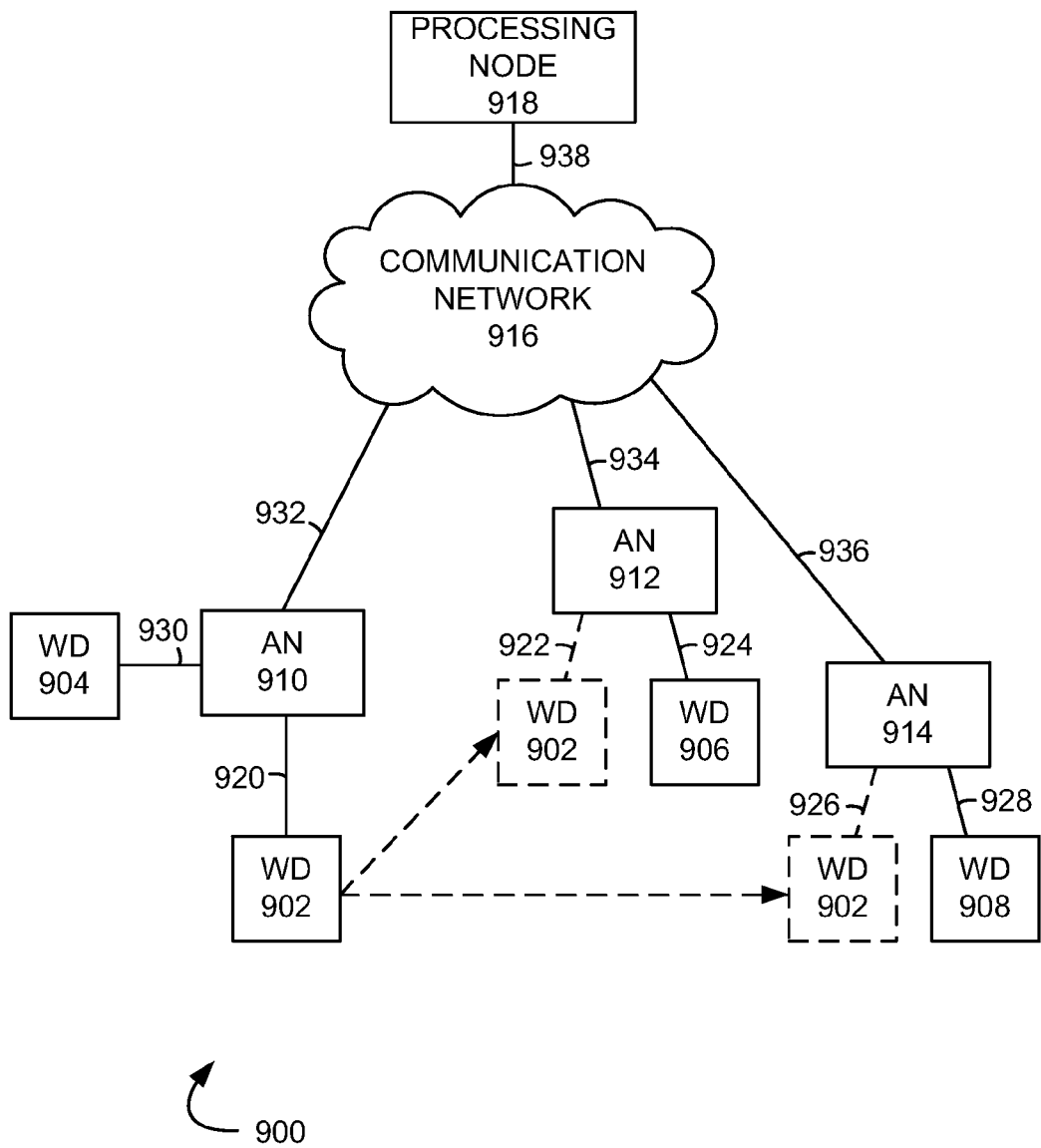
FIG. 9 illustrates another exemplary system to determine access node capacity.

FIG. 9 illustrates another exemplary system 900 to determine access node capacity comprising wireless devices 902, 904, 906 and 908, access nodes 910, 912 and 914, communication network 916, and processing node 918. Examples of wireless devices 902, 904, 906 and 908 can comprise a cell phone, a smart phone, a computing platform such as a laptop, palmtop, or tablet, a personal digital assistant, or an internet access device, including combinations thereof. Wireless device 902 can communicate with access node 910 over communication link 920, with access node 912 over communication link 922, and with access node 914 over communication link 926. Wireless device 904 can communicate with access node 910 over communication link 930. Wireless device 906 can communicate with access node 912 over communication link 924. Wireless device 908 can communicate with access node 914 over communication link 928.

Access nodes 910, 912 and 914 are each a network node capable of providing wireless communications to wireless devices 902, 904, 906 and 908, and can be, for example, a base transceiver station, a radio base station, an eNodeB device, or an enhanced eNodeB device. Access node 910 is in communication with communication network 916 over communication link 932, access node 912 is in communication with communication network 916 over communication link 934, and access node 914 is in communication with communication network 916 over communication line 936.

Communication network 916 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 916 can be capable of carrying voice information and other data, for example, to support communications by a wireless device such as wireless devices 902, 904, 906 and 908. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 916 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 916 may also comprise a wireless network, including base stations, wireless communication nodes, telephony switches, internet routers, network gateways, computer systems, communication links, or some other type of communication equipment, and combinations thereof.

Processing node 918 is in communication with communication network 916 over communication link 938, and can comprise a processor and associated circuitry to execute or direct the execution of computer-readable instructions. Processing node 918 can be configured to maintain determine the capacity of an access node such as access nodes 910, 912 and 914. Processing node 918 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 918 can receive instructions and other input at a user interface. Examples of processing node 918 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and network gateways, including combinations thereof.

Communication links 920, 922, 924, 926, 928, 930, 932, 934, 936 and 938 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 900 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 910, 912 and 914, communication network 916 and processing node 918 which are omitted for clarity, including additional processing nodes, routers, gateways, and physical and/or wireless data links for carrying data among the various network elements.

Figure 10:
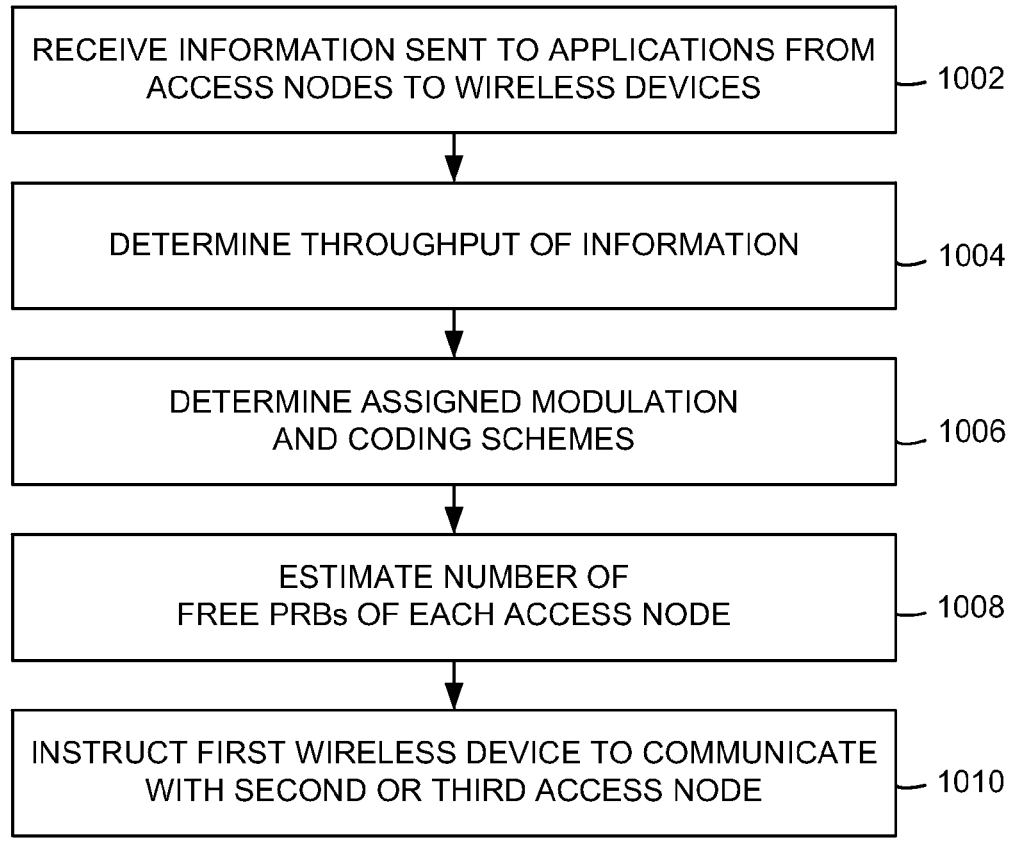
FIG. 10 illustrates another exemplary method of determining access node capacity device.

FIG. 10 illustrates another exemplary method of determining access node capacity device. Information is sent to an application running on each of a plurality of wireless devices, each wireless device in communication with an access node (operation 1002), and a throughput is determined of the information received at each application running on each wireless device (operation 1004). For example, information can be sent to from access node 910 to wireless devices 902 and 904; from access node 912 to wireless device 906; and from access node 914 to wireless device 908. Each of wireless devices 902, 904, 906 and 908 can comprise an application running which receives the information sent from an access node. The wireless devices can launch the application and request that a respective access node sends the information to the application. Alternatively, processing node 918, an access node, or another network element of communication system 900 can instruct one or more wireless device to launch the application, and one or more access nodes can send the information to the one or more wireless device. In an embodiment, the information sent to the one or more wireless devices can be test data. In an embodiment, wireless device 904 can be a wireless device located proximate to access node 910 as a probe wireless device. The proximate location of wireless device 904 can comprise a location within a predetermined radius from access node 910. The proximate location can also comprise the same or substantially similar geographic location as access node 910.

The information sent by each access node can be associated with a particular traffic class indicator, and each access node can allocate wireless communication link resources based on the traffic class indicator. In an embodiment, the information sent to the application running on wireless devices can be associated with the lowest traffic class indicator from among a plurality of traffic class indicators. A throughput is determined of the information received at the application running on each wireless device.

In operation 1006, a modulation and coding scheme which is assigned to each wireless device to communicate with a respective access node is determined. For example, wireless device 902 can be instructed to use a particular modulation and coding scheme to communicate with access node 910. The assigned modulation and coding scheme affects the bit rate and robustness of data transmission between wireless device 902 and access node 910. Examples of a modulation and coding scheme include quadrature phase shift keying (QPSK), 16 quadrature amplitude modulation (16QAM), 64 quadrature amplitude modulation (64QAM), and the like. The modulation and coding scheme can also include an amount of data repetition to provide for forward error correction of the transmitted data. Similarly, an assigned modulation and coding scheme can be determined with respect to wireless device 904 and access node 910, wireless device 906 and access node 912, and wireless device 908 and access node 914.

Based on the throughput and the modulation and coding scheme, a number of free physical resource blocks per frame of the each access node is estimated (operation 1008). When the information sent to the application running on each of wireless devices 902, 904, 906 and 908 is associated with the lowest traffic class indicator, resource blocks are typically only allocated to the lowest traffic class indicator when they are not used for any higher priority traffic class. Accordingly, a number of wireless resources, such as resource blocks or other similar wireless communication link resources, allocated to carry information associated with the lowest traffic class indicator can provide an indication of the unutilized or free resources available at the access node.

In an embodiment, the number of free physical resource blocks per frame of the first, second and third access nodes can be estimated at a predetermined time, where the predetermined time is based on historical capacity information of the first access node. Records of capacity determinations over time of access node 910 can be maintained, and patterns of access node can be determined from the historical capacity records. For example, a period of time when the capacity (or loading) of access node 910 meets a threshold can be determined, and based on that determination it can be anticipated that access node 910 may seek to hand over one or more wireless devices to another access node during the determined period of time. The determined period of time can be, for example, a time, a time range, a day, a date range, and the like. Historical capacity records can be used together with the determined throughput of information, as well as the determined assigned modulation and coding schemes, to estimating the number of free physical resource blocks per frame of the first access node. Where available, historical capacity records of the second and third access nodes can also be used together with the respective determined throughput of information, as well as the determined assigned modulation and coding schemes, to estimating the number of free physical resource blocks per frame of the first, second and third access nodes at the predetermined time.

In operation 1010, based on the estimated number of free physical resource blocks per frame of the first access node, the second access node, and the third access node, the first wireless device can be instructed to change from communicating with the first access node to communicating with the third access node. For example, based on the estimated number of free physical resource blocks per frame of access nodes 910, 912 and 914, it can be determined that access node 914 has the greatest capacity (or lowest load), and wireless device 902 can be instructed to change from communicating with access node 910 over communication link 902 to communicating with access node 914 over communication link 926. Similarly, when access node 912 is determined to have the greatest capacity (or lowest load) from among access nodes 910, 912 and 914, wireless device 902 can be instructed to change to communicating with access node 912 over communication link 922.

In an embodiment, the first access node does not receive capacity information from the second access node or the third access node. For example, access node 910 may not receive capacity or loading information from access nodes 912 or 914, because a communication link has failed or does not exist, or because access node 912 and/or 914 are associated with a different provider network than access node 710 which does not share capacity or loading information, or because access nodes 912 and 914 are not properly configured to share loading or capacity information with access node 910, or for some other reason. In any event, access node 910 does not receive capacity or loading information from access node 912 or access node 914. Thus, communication system 900 can determine access node capacity independent of any mechanism or particular implementation of a capacity determining mechanism at one of access nodes 910, 912 or 914.

Figure 11:
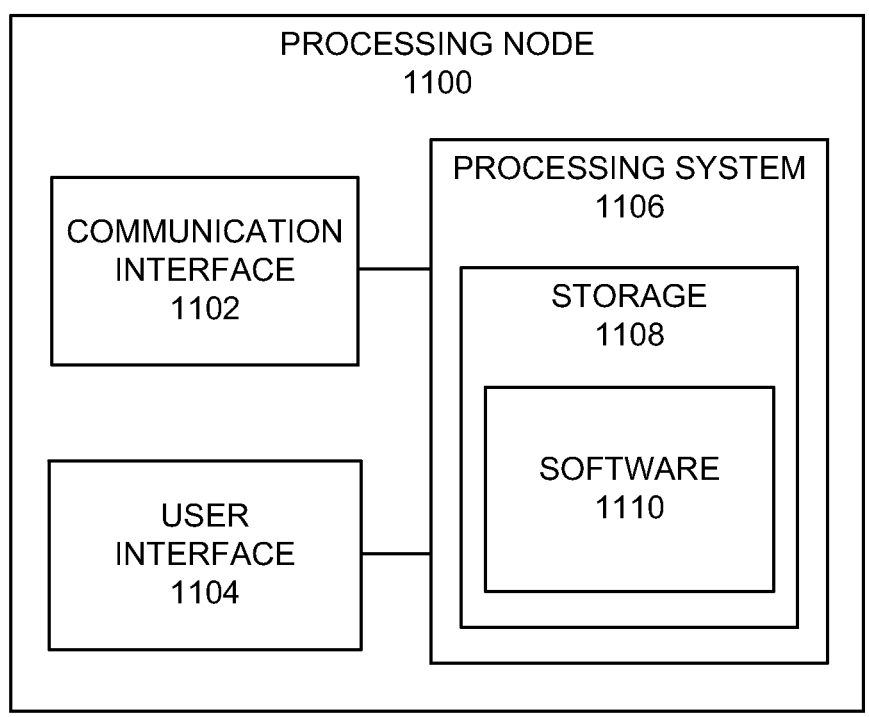
FIG. 11 illustrates an exemplary processing node.

FIG. 11 illustrates an exemplary processing node 1100 in a communication system. Processing node 1100 comprises communication interface 1102, user interface 1104, and processing system 1106 in communication with communication interface 1102 and user interface 1104. Processing node 1100 can be configured to determine access node capacity in a communication system. Processing system 1106 includes storage 1108, which can comprise a disk drive, flash drive, memory circuitry, or other memory device. Storage 1108 can store software 1110 which is used in the operation of the processing node 1100. Storage 1108 may include a disk drive, flash drive, data storage circuitry, or some other memory apparatus. Software 1110 may include computer programs, firmware, or some other form of machine-readable instructions, including an operating system, utilities, drivers, network interfaces, applications, or some other type of software. Processing system 1106 may include a microprocessor and other circuitry to retrieve and execute software 1110 from storage 1108. Processing node 1100 may further include other components such as a power management unit, a control interface unit, etc., which are omitted for clarity. Communication interface 1102 permits processing node 1100 to communicate with other network elements. User interface 1104 permits the configuration and control of the operation of processing node 1100.

Examples of processing node 1100 include processing node 510, processing node 716, and processing node 918. Processing node 1100 can also be an adjunct or component of a network element, such as an element of an access node or another network element. Processing node 1100 can also be another network element in a communication system. Further, the functionality of processing node 1100 be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of determining access node capacity, comprising:
   determining a first throughput of information received from a first access node at an application running on a wireless device;
   determining a second throughput of information received from a second access node at the application running on the wireless device, wherein the first access node does not receive capacity information from the second access node;
   identifying unique modulation and coding schemes (MCS') assigned to the wireless device for communication with the respective first and second access nodes;
   estimating a number of free physical resource blocks per frame of the first access node and of the second access node based on the respective first and second throughputs of information and based on the identified MCS' assigned to the wireless device for communication with each of the first and second access nodes; and,
   based on the estimated number of free physical resource blocks per frame of the first access node and of the second access node, instructing the wireless device to change from communicating with the first access node to communicating with the second access node.

2. The method of claim 1, wherein the first throughput of information received at the application running on the wireless device is associated with a lowest traffic class indicator from among a plurality of traffic class indicators.

3. The method of claim 1, further comprising:
   changing the MCS assigned to the wireless device for communication with the first access node to a second MCS;
   determining a third throughput of the information received from the first access node at the application running on the wireless device; and
   estimating, based on the third determined throughput of information, a second number of free physical resource blocks per frame of the first access node based on the second MCS and the third throughput.

4. The method of claim 3, further comprising determining a total number of free physical resource blocks per frame of the first access node based on the estimated number of free physical resource blocks per frame of the first access node.

5. The method of claim 1, further comprising:
   instructing the wireless device to change from communicating with the first access node to the second access node when the estimated number of free physical resource blocks per frame of the first access node and of the second access node indicate that the second access node has a greater capacity than the first access node.

6. The method of claim 1, wherein the second throughput of information received from the second access node at the application running on the wireless device comprises test data sent from the first access node to the wireless device.

7. A method of determining access node capacity, comprising:
- determining a first throughput of information received from a first access node at an application running on a first wireless device;
- determining a second throughput of information received from a second access node at an application running on a second wireless device, wherein the first access node does not receive capacity information from the second access node;
- identifying a modulation and coding scheme (MCS) assigned to the first wireless device for communication with the first access node;
- identifying a MCS assigned to the second wireless device for communication with second access node;
- estimating a number of free physical resource blocks per frame of the first access node based on the first throughput of information and the MCS assigned to the first wireless device, and a number of free physical resource blocks per frame of the second access node based on the second throughput of information and the MCS assigned to the second wireless device; and
- based on the estimated number of free physical resource blocks per frame of the respective first and second access nodes, instructing the first wireless device to change from communicating with the first access node to communicating with the second access node.

8. The method of claim 7, further comprising:
- instructing the first wireless device to change from communicating with the first access node to communicating with the second access node when the estimated number of free physical resource blocks per frame of the first access node and of the second access node indicate that the second access node has a greater capacity than the first access node.

9. The method of claim 7, wherein the first throughput of information received from the first access node at the first wireless device and the second throughput of information received from the second access node at the second wireless device are each associated with a lowest traffic class indicator from among a plurality of traffic class indicators.

10. The method of claim 7, further comprising:
- determining a third throughput of information received from the first access node at an application running on a third wireless device;
- identifying a MCS assigned to the third wireless device for communication with the first access node, wherein the MCS assigned to the third wireless device is different than the MCS assigned to the first wireless device;
- determining a fourth throughput of information received from the second access node at an application running on a fourth wireless device;
- identifying a MCS assigned to the fourth wireless device for communication with the second access node, wherein the MCS assigned to the fourth wireless device is different than the MCS assigned to the second wireless device;
- estimating the number of free physical resource blocks per frame of the first access node based on the first throughput of information received at the first wireless device, the MCS assigned to the first wireless device, the third throughput of information received at the third wireless device, and the MCS assigned to the third wireless device; and
- estimating the number of free physical resource blocks per frame of the second access node based on the second throughput of information received at the second wireless device, the MCS assigned to the second wireless device, the fourth throughput of information received at the fourth wireless device, and the MCS assigned to the fourth wireless device.

11. The method of claim 7, further comprising:
- determining a third throughput of information received from a third access node at an application running on a third wireless device;
- identifying a MCS assigned to the third wireless device for communication with third access node; and
- estimating a number of free physical resource blocks per frame of the third access node based on the third throughput of information and the MCS assigned to the third wireless device, and
- wherein the first and second access nodes do not receive capacity information from the third access node.

12. The method of claim 11, further comprising:
- instructing the first wireless device to change from communicating with the first access node to communicating with the third access node based on the estimated number of free physical resource blocks per frame of the first access node, the second access node, and the third access node.

13. The method of claim 11 further comprising:
- instructing the first wireless device to change from communicating with the first access node access to communicating with the third access node when the estimated number of free physical resource blocks per frame of the first access node, the second access node, and the third access node indicate that the third access node has a greater capacity than the first and second access nodes.

14. The method of claim 12, wherein the first throughput of information received from the first access node, the second throughput of information received from the second access node, and the third throughput of information received from the third access node are each associated with a lowest traffic class indicator from among a plurality of traffic class indicators.

15. The method of claim 11, further comprising:
- estimating the number of free physical resource blocks per frame of the first access node, the second access node, and the third access node at a predetermined time based on historical capacity information of the first access node.

16. The method of claim 11, further comprising:
- estimating the number of free physical resource blocks per frame of the first access node, the second access node, and third access node at a predetermined time based on historical capacity information of the first access node, the second access node, and third access node.

* * * * *